United States Patent
Vallespi et al.

(10) Patent No.: US 11,087,511 B1
(45) Date of Patent: Aug. 10, 2021

(54) AUTOMATED VECTORIZATION OF A RASTER IMAGE USING A GRADIENT MESH WITH ARBITRARY TOPOLOGY

(71) Applicant: Adobe Inc., San Jose, CA (US)

(72) Inventors: Jose Ignacio Echevarria Vallespi, San Jose, CA (US); Gerben Hettinga, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/858,174

(22) Filed: Apr. 24, 2020

(51) Int. Cl.
 *G06T 11/20* (2006.01)
 *G06T 11/00* (2006.01)
 *G06T 3/40* (2006.01)

(52) U.S. Cl.
 CPC ............ *G06T 11/203* (2013.01); *G06T 3/403* (2013.01); *G06T 11/001* (2013.01); *G06T 2200/24* (2013.01)

(58) Field of Classification Search
 CPC ...... G06T 11/20; G06T 11/203; G06T 11/001; G06T 3/403; G06T 2200/24
 See application file for complete search history.

(56) References Cited

PUBLICATIONS

Xie, Guofu, et al., "Hierarchical Diffusion Curves for Accurate Automatic Image Vectorization", ACM Transactions on Graphics, Graph. 33, 6, Article 230, Nov. 2014, 11 pages.

Favreau, Jean-Dominique, et al., "Photo2clipart: Image Abstraction and Vectorization Using Layered Linear Gradients", ACM Transactions, Graph. 36, 6, Article 180, Nov. 2017, 11 pages.

Lai, Yu-Kun, et al., "Automatic and topology-preserving gradient mesh generation for image vectorization", ACM SIGGRAPH 2009 papers (SIGGRAPH '09), Article 85, Jul. 2009, 8 pages.

Chen, Kuo-Wei, et al., "Image Vectorization with Real-Time Thin-Plate Spline," in IEEE Transactions on Multimedia, vol. 22, Issue 1, Jan. 2020, 15 pages.

Hoshyari, Shayan, et al., "Perception-Driven Semi-Structured Boundary Vectorization", ACM Transactions on Graphics, 37, 4, Article 118, Jul. 2018, 14 pages.

Kosinka, Lieng, H., "A Colour Interpolation Scheme for Topologically Unrestricted Gradient Meshes", Computer Graphics Forum, 36, Apr. 2016, 11 pages.

Hettinga, Gerben J, et al., "Colour Interpolants for Polygonal Gradient Meshes", Computer Aided Geometric Design, vol. 74, 2019, 12 pages.

(Continued)

*Primary Examiner* — Jeffery A Brier
(74) *Attorney, Agent, or Firm* — Kilpatrick Townsend & Stockton LLP

(57) ABSTRACT

A method includes accessing a digital image in a raster representation and identifying edges in the digital image. A set of curves are generated by fitting each of the edges with a corresponding curve. A curvilinear triangulation is generated to include the set of curves. The method further includes generating a gradient mesh based on the curvilinear triangulation, where the gradient mesh includes polygons of the curvilinear triangulation along with control points based on the curvilinear triangulation. A respective color is determined for each control point of the gradient mesh, based on pixel colors of pixels of the raster representation corresponding to the control points in the gradient mesh. The method further includes generating a vector representation of the digital image, where the vector representation includes the gradient mesh with colors of the control points.

20 Claims, 9 Drawing Sheets

(56) References Cited

PUBLICATIONS

Xia, Tian, et al., "Patch-based Image Vectorization with Automatic Curvillinear Feature Alignment", ACM Transactions on Graphics, vol. 28, Issue 5, Dec. 2009, 10 pages.

Tan, Jianchao, et al., "Efficient Palette-Based Decomposition and Recoloring of Images via RGBXY-space geometry", ACM Transactions on Graphics, 37, 6, Article 262, Dec. 2018, 10 pages.

AUTOMATED VECTORIZATION OF A RASTER IMAGE USING A GRADIENT MESH WITH ARBITRARY TOPOLOGY

TECHNICAL FIELD

This disclosure generally relates to digital images. More specifically, but not by way of limitation, embodiments described herein relate to automated vectorization of a raster image using a gradient mesh with arbitrary topology.

BACKGROUND

Digital images can be stored in various formats. For instance, a raster image is a digital image stored in raster format, also referred to as a bitmap. A raster image is represented in storage as a set of pixels, where each pixel is associated with a position in a grid and is associated with color attributes (e.g., red, blue, and green color values), also referred to herein as color components. To render a raster image, a computer processor reads the raster image from storage and renders the pixels in a grid, with each pixel rendered in the respective color corresponding to the color attributes associated with that pixel. A vector image is represented in storage as a set of analytical vector primitives (e.g., polygons) and associated colors of each vector primitive. To render a vector image, a computer processor reads the vector image from storage and renders the indicated vector primitives in the colors indicated as applicable to such vector primitives.

Although raster images can be efficiently rendered given the relative ease of simply generating pixels in the indicated colors, raster images have the drawback of being difficult to scale. For instance, given a raster image that is stored as $2^8$ pixels in a square grid, enlarging this raster image to twice its size would then require $2^9$ pixels, but color attributes are known only for half that number of pixels. As a result, an enlargement typically requires interpolating data to try to minimize undesirable artifacts that can result during an enlargement. Additionally, shrinking a raster image may require combining multiple pixels into single pixels, which risks destroying key visual features of the raster image. In contrast, the vector primitives that make up a vector image are defined by, for example, the formulas of their edges or by the coordinates of their vertices. This data can be scaled easily to correspond to a changed image size, and thus, vector images are well suited for scaling and editing.

A user of a digital image might wish to use the digital image for various purposes that may require that the size of the digital image be changed. For instance, it may be desirable to enlarge a digital image to make it suitable for printing or for display on a large screen (e.g., a projector screen). Alternatively, it might be desirable to shrink a digital image to enable a computer processor to render the digital image more quickly than expected with a larger image. However, if the digital image is a raster image, then resizing the digital image may be difficult or may reduce the visual quality of the digital image.

SUMMARY

Certain embodiments described herein vectorize a raster image. For instance, a method described herein involves accessing a digital image in a raster representation and identifying edges in the digital image. In one example, a user provides a raster image to a computer system and requests vectorization of the raster image. The method further involves identifying edges in the raster image and generating a set of curves by fitting each of the edges with a corresponding curve. For instance, using an edge-detecting technique, the computer system identifies structural edges, which are discontinuities indicating boundaries in the raster image, and appearance edges, which indicate textures and other discontinuities internal to such boundaries. The method involves generating a curvilinear triangulation based on the set of curves. For instance, a triangulation technique such as the constrained Delaunay triangulation technique is used with the edges as constraints to determine the curvilinear triangulation.

The method further involves generating a gradient mesh based on the curvilinear triangulation, where the gradient mesh includes polygons of the curvilinear triangulation along with control points based on the curvilinear triangulation. A respective color is determined for each control point of the gradient mesh, based on pixel colors of pixels of the raster representation corresponding to the control points in the gradient mesh. For instance, the gradient mesh has the same polygons as the curvilinear triangulation, but control points are added to each polygon of the gradient mesh. Each control points is associated with a color such that the control points define gradients across the gradient mesh. In this example, the computer system returns to the user a vector representation of the digital image, where the vector representation includes the gradient mesh, which incorporates edges identified in the raster image and also includes smooth color transitions.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
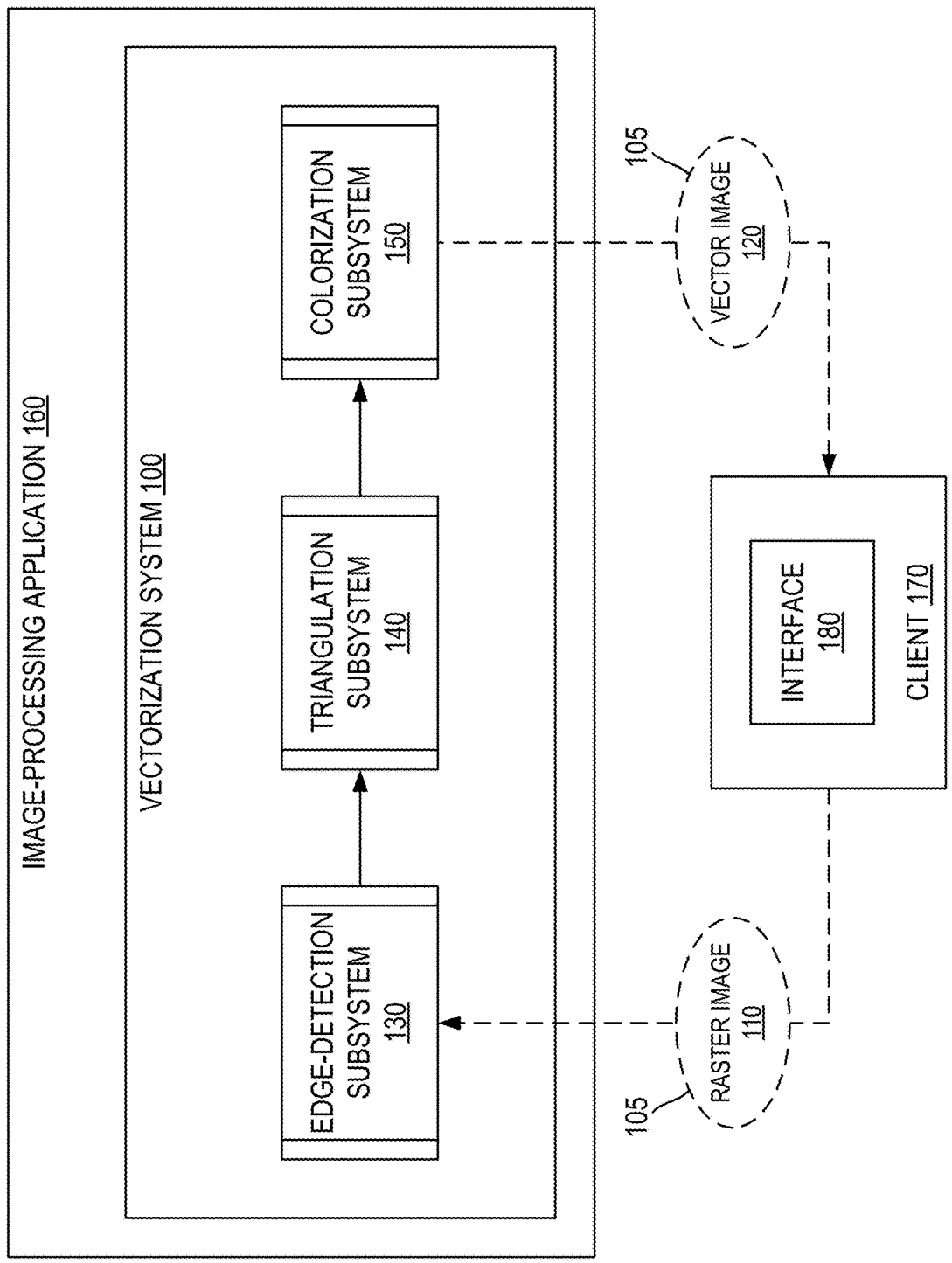
FIG. 1 is a diagram of a vectorization system for vectorizing a raster image to generate a vector image, according to certain embodiments described herein.

The present disclosure includes systems and methods for automatically vectorizing (i.e., converting to a vector image)

a raster image. Generally, vectorization is the process of converting an image in raster format into a scalable format, specifically vector format, such that the image can be displayed at various resolutions without loss of quality. Vectorization involves decomposing the image into a set of vector primitives, which can be lines, curves, color gradients, or other constructs. As described in detail below, embodiments described herein perform automated vectorization in an efficient manner, while maintaining gradual or natural color changes that exist in a raster image. Further, some embodiments produce a vector image that is easily editable in an intuitive manner.

Current vectorization approaches either fail to generate a vector image quickly, are not able to generate an easily editable vector image, or fail to accurately represent the shapes and colors of the original raster image. For instance, one example of an existing technique outputs vector paths (e.g., edges or curves) associated with solid colors. This technique is unable to represent smooth color transitions, and further, the overabundance of small paths do not to accurately capture the smoothness of the raster image and are difficult to edit manually. Another technique uses diffusion curves and, as a result, is able to retain fine detail from the raster image, but this technique leads to a resulting vector image that is dense with vector primitives and thus difficult to edit. For instance, diffusion lines are disconnected from one another and can be non-intuitive to edit due to their small size and high quantity. Some other techniques aim for a more user-friendly decomposition of the raster image into paths that have solid colors and linear color gradient overlays. However, these techniques require extensive user interaction, as well as significant expertise from the user to provide input as to how to decompose complex appearances into vector primitives. Some techniques based on superpixels and similar cluster-based representations suffer from both expressivity and editability (i.e., ease of editing the result). Further, some recent techniques attempt to fit a gradient mesh to an original image; however, this fitting results in high-resolution gradient meshes that are difficult to edit. For instance, each mesh patch in such a gradient mesh utilizes polygons arranged in a simple but strict grid structure. The grid structure requires a large number of control points or a high resolution of mesh patches, or both. This leads to poor user editability and poor rendering performance.

As explained above, conventional solutions have various drawbacks, such as requiring manual intervention or providing a result that is so dense with respect to vector primitives (i.e., vector constructs such as paths or polygons) that it is difficult or non-intuitive to edit. Certain embodiments described herein improve upon existing techniques for vectorizing a raster image by providing a technique capable of providing a vector image that is configurably sparse with respect to the quantity of polygons, resulting in a vector image that is intuitive to edit and still highly accurate to the original raster image. Further, embodiments described herein operate without user intervention to vectorize a raster image based on automatically identified edges, so as to generate a curvilinear triangulation based on the edges and, further, a gradient mesh based on the curvilinear triangulation. Further, some embodiments apply color gradients to the image based on the gradient mesh generated from the curvilinear triangulation. The use of a gradient mesh that is based on edges in the image enables some embodiments to preserve natural shapes and colors in the vectorization process while providing an easily editable result.

A gradient mesh is unstructured in that a gradient mesh includes polygons of arbitrary shapes and sizes, rather than such polygons being fixed to an established grid or being fixed to an established number of sides per polygon. Embodiments described herein leverage the unstructured nature of a gradient mesh to automatically generate a sparse two-dimensional (2D) representation of a digital image. In some embodiments, each polygon of the gradient mesh is used to build a three-dimensional (3D) Bezier surface to represent the color information, enabling complex gradients to be achieved given an underlying 2D spatial topology that, in some embodiments, is based on edges identified in the digital image. Further, some embodiments generate the gradient mesh using graphics processing unit (GPU)-accelerated tessellation with a configurable level of detail, which can enable fast generation of the resulting vector image suitable for real-time user interactions.

The following non-limiting example is provided to introduce certain embodiments. In this example, a vectorization system converts a digital image from a raster format, or raster representation, to a vector format, or vector representation. Specifically, a user utilizes the vectorization system to vectorize a raster image, which the user provides to the vectorization system. The vectorization system automatically generates a vector image based on the raster image.

In this example, the vectorization system identifies edges (i.e., discontinuities) in the raster image. Those edges include both structural edges, which may indicate boundaries of objects, and appearance edges, which may indicate textures or other discontinuities interior to such boundaries. The vectorization system fits a set of Bezier curves to the edges of the digital image, including fitting one or more Bezier curves to each edge. Each Bezier curve is a cubic Bezier curve and thus has four control points, including two at the endpoints and two that may or may not lie on the Bezier curve itself. In some cases, multiple curves may be fit to an edge to ensure that a difference between the edge and its corresponding curve, or corresponding curves, stays within a threshold. The vectorization system then generates a curvilinear triangulation based on the set of Bezier curves, such that the curvilinear triangulation includes the Bezier curves as well as edges connecting incident Bezier curves.

In this example, the vectorization system generates a gradient mesh based on the curvilinear triangulation. The gradient mesh includes a set of mesh patches that are the various triangles of the curvilinear triangulation. Further, the gradient mesh has a set of control points, which include the control points of the Bezier curves of the curvilinear triangulation as well as six additional control points in each mesh patch. The vectorization system determines color attributes of each control point, based on the basis functions contributing to the positions of the control points and further based on the color attributes of the pixels at the corresponding positions in the raster image. With colors for the control points of the gradient mesh established, the vectorization system outputs a vector image, corresponding to the raster image, indicating the gradient mesh with associated control points and further indicating color attributes associated with each control point. Given such a vector image, an image-processing application can render the vector image by evaluating the gradient mesh with control points in the indicated colors, such that the image-processing application will render smooth gradients between the control points.

Certain embodiments described herein generate vector images based on raster images and do so through an improvement to existing techniques of vectorizing raster images. With some embodiments described herein, a raster image can be converted into a vector image quickly while maintaining the appearance of the raster image, both in terms of edges being preserved and in terms of natural color transitions being preserved. Further, some embodiments provide an intuitively editable raster image, based on a configurable sparsity of appearance edges.

Referring now to the drawings, FIG. 1 is a diagram of a vectorization system 100 according to some embodiments described herein. As shown in FIG. 1, the vectorization system 100 inputs a raster image 110, which is a digital image 105 in raster format, also referred to as a raster representation of the digital image 105. An example of the raster image 110 includes a set of pixels, each pixel being associated with a set of color attributes. For instance, the color attributes of a pixel might be a red channel value, a green channel value, and a blue channel value. Taken together, the color attributes of a pixel are referred to herein as the color of the pixel.

The vectorization system 100 processes the raster image 110 to generate and output a vector image 120, which is the same digital image 105 in vector format, also referred to as a vector representation of the digital image 105. An example of the vector image 120 includes a set of vector constructs, or vector primitives, associated with a set of color constructs associated with such vector constructs. For instance, in some embodiments, a vector image 120 is stored in a computer-readable storage medium in a storage object that indicates a gradient mesh along with associated color information of each control point of the gradient mesh.

An example of the vectorization system 100 includes one or more subsystems, such as an edge-detection subsystem 130, a triangulation subsystem 140, and a colorization subsystem 150. Generally, the edge-detection subsystem 130 identifies edges in the raster image 110, the triangulation subsystem 140 generates curves based on the edges and determines a triangulation based on the curves, and the colorization subsystem 150 generates a gradient mesh based on the triangulation and determines a color for each control point of the gradient mesh. The vectorization system 100 outputs a vector image that includes a gradient mesh including colors of control points. The operations of each of these subsystems will be described in more detail below.

Each subsystem of the vectorization system 100 can be implemented as hardware, software, or a combination of both. For instance, each subsystem can be or can include a software function or set of software functions, or each subsystem can be or can include a specialized hardware circuit, such as a field-programmable gate array. Further, it will be understood that, although these subsystems are shown and described as being distinct, this distinction is made for illustrative purposes only. The subsystems may utilize the same or overlapping hardware, software, or a combination thereof.

As shown in FIG. 1, an example of the vectorization system 100 is associated with an image-processing application 160, such as Adobe® Photoshop®. For instance, as shown in the example of FIG. 1, the vectorization system 100 is integrated with the image-processing application. As such, the image-processing application 160 can utilize the vectorization system 100 to generate vector images 120 as requested by users. Additionally or alternatively, the vectorization system 100 can be distinct from the image-processing application 160. In that case, a vector image 120 generated by the vectorization system 100 can be rendered through the image-processing application 160 or through an image-viewing application.

In some embodiments, a user operates a client 170, such as a client device or client application, that communicates with the vectorization system 100. For instance, the vectorization system 100 provides an interface 180 displayed on the client 170, such that the interface 180 enables the user to interact with the vectorization system 100. Through the interface 180, the user can provide the raster image 120 and can receive the vector image 120. In some embodiments, as shown in FIG. 1, the client 170 is remote from a computing device executing the vectorization system 100. For instance, the vectorization system 100 operates in a cloud, and the vectorization system provides instructions to the client 170 for displaying the interface 180, by which the user can communicate with the vectorization system 100. Additionally or alternatively, however, the client 170 executes the vectorization system 100, such that the vectorization system 100 operates on a local computing device of the user. It will be understood that various implementations are possible and within the scope of this disclosure.

Figure 2:
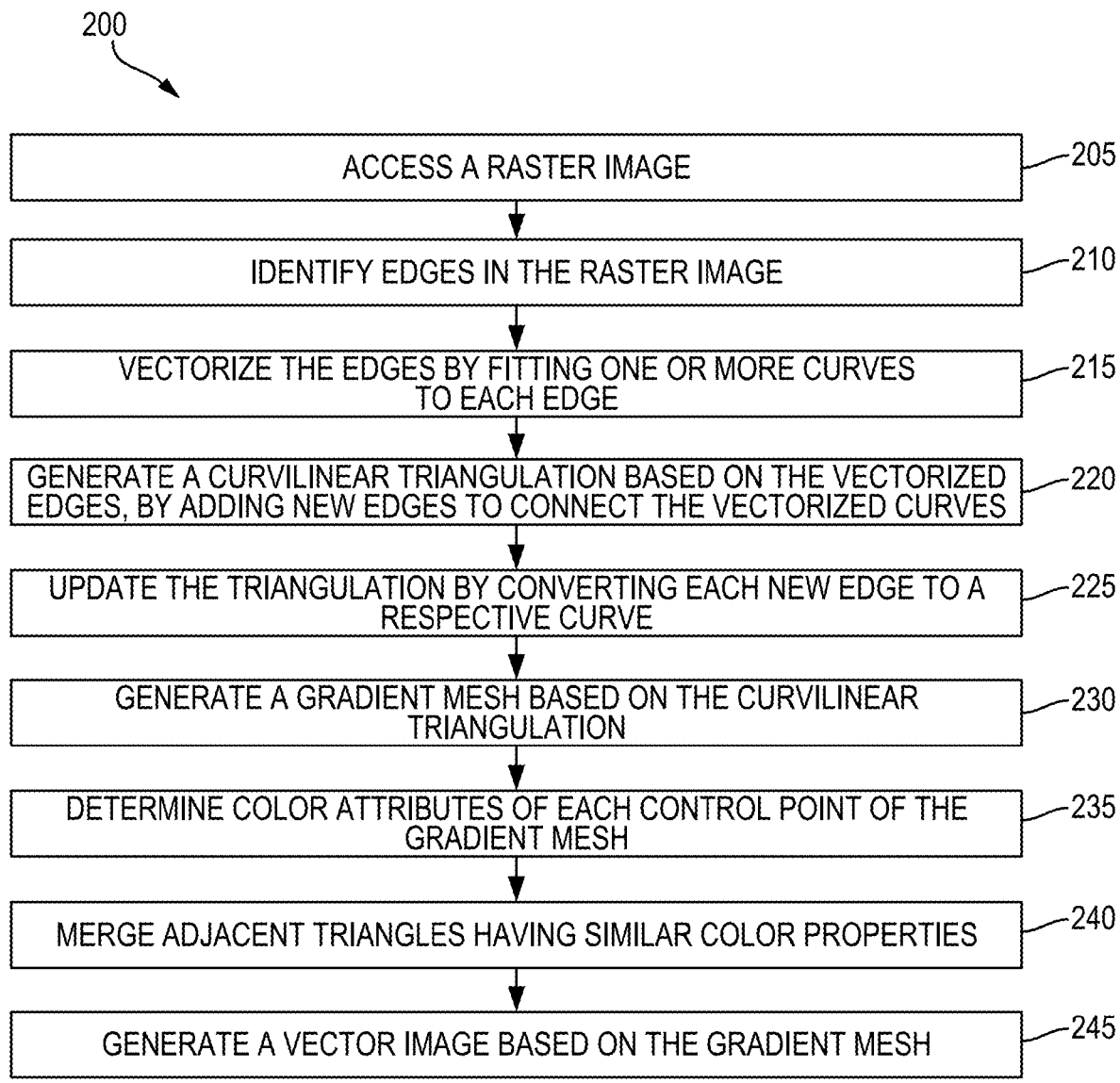
FIG. 2 is a diagram of a process of vectorizing the raster image, according to certain embodiments described herein.

FIG. 2 is a diagram of a process 200 of vectorizing a raster image 110, thereby generating a vector image 120, according to some embodiments described herein. As shown in FIG. 2, at block 205, the process 200 involves accessing a raster image 110, which is a digital image 105 provided in raster format. For instance, an embodiment of the vectorization system 100 includes an interface that enables a user to indicate a raster image 110, such as by referencing a file in which the raster image 110 is stored. Upon receiving such indication, the vectorization system 100 accesses the raster image 110, such as by opening the file. In another embodiment, the vectorization system 100 performs batch vectorizing of raster images 110. In that case, for example, a human or automated user provides the vectorization system 100 with references to a set of files that include raster images 110, and the vectorization system 100 accesses each file so as to access the corresponding raster images 110. It will be understood that various techniques exist for receiving an indication of a raster image 110 and accessing that raster image 110.

At block 210, the process 200 involves identifying features, specifically edges (i.e., discontinuities), in the raster image 110. As mentioned above, an example of the vectorization system 100 includes various subsystems. In some embodiments, this identification of edges is performed by the edge-detection subsystem 130 of the vectorization system 100.

In some embodiments, the vectorization system 100 utilizes an edge-detection technique to identify edges. Various edge-detection techniques exist and can be used by the vectorization system 100 to identify edges of the raster image 110. Specifically, some embodiments identify two types of edges, including structural edges, which act as boundaries delimiting object in the raster image 110, and appearance edges, which can indicate texture or shading interior to such boundaries. The sparsity or density of appearance edges identified determined a level of detail achieved by the vectorization. For instance, in some embodiments, if an edge-detection technique is used to find appearance images with a relatively high discontinuity threshold, such that a relatively low number of appearance edges are identified, then the gradient mesh generated later will be sparser for a simplified or abstracted appearance.

Some embodiments utilize a different edge-detection technique to identify structural edges versus appearance edges. For instance, the vectorization system 100 utilizes a relatively sparse and perceptual machine learning technique for identifying structural edges and a controllable technique for identifying appearance edges. In one example, the vectorization system 100 uses the Canny edge detector technique to identify edges, specifically appearance edges, for instance, with a low threshold for determining whether a discontinuity (i.e., an edge) exists. Through the use of Canny or other techniques, the user can configure the threshold so as to control the level of detail in edges identified and, thus, to control the level of detail in the final vector image 120. The differing techniques used for appearance edges versus structural edges can enable determination of a sufficiently detailed vector image 120 that supports intuitive editing due to sparse or customizable appearance edges.

At block 215, the process 200 involves vectorizing the edges identified at block 210 by fitting one or more curves to each of such edges. Specifically, an example of the vectorization system 100 utilizes Bezier curves that are two dimensional, such as cubic Bezier curves, and fits one or more Bezier curves to each edge. As discussed above, the vectorization system 100 can include various subsystems; in some embodiments, the triangulation subsystem 140 vectorizes the identified edges.

In one example, for each edge, the vectorization system 100 fits a curve to the edge. The vectorization system 100 determines an error between the curve and the corresponding edge to which the curve was fit. Various techniques exist in the art for fitting a curve, such as a Bezier curve, to an edge, and the vectorization system 100 can use one or more of such techniques. Further, various techniques exist for determining an error between a curve and an edge, and the vectorization system 100 can use one or more of those techniques as well. For instance, some embodiments use a least-squares fitting of Bezier curves, and the error is determined by sampling a fitted Bezier curve and comparing the samples to positions of the pixels in the corresponding edge. If the error between a curve and its corresponding edge is greater than a threshold, then the vectorization system 100 subdivides the edge to form two edges, which include (1) a second edge that is a portion of the original edge and (2) a reduced version of the original edge, which is shortened by the exclusion of the second edge. In other words, when the error is too large, the vectorization system 100 splits the edge. The vectorization system 100 then recursively fits a curve to each of the resulting edges, continuing to subdivide each curve until the error between each curve and its corresponding edge is less than the threshold. Thus, eventually, the vectorization system 100 has fit one or more curves to an edge, with each curve having no more than a threshold error compared to a corresponding portion of the edge. Because the vectorization system 100 performs this recursive process of fitting and subdividing for each edge, the vectorization system 100 generates a set of curves, which includes one or more curves fit to each edge.

In some embodiments, there is a tradeoff involved in choosing the threshold for errors between curves and edges. For instance, a low threshold (i.e., requiring a low error to be acceptable) results in a vector image 120 of higher detail and thus with high fidelity to the original raster image 110. However, a low threshold also results in increased computation time for fitting the curves, because an increased number of subdivisions of a curve may be required for the error to fall below the threshold. As such, the resulting vector image 120 will include an increased number of curves, corresponding to higher fidelity with the original raster image 110. In contrast, a high threshold (i.e., allowing a higher error) results in a vector image 120 of lower detail but still high quality, and the curves might be easier to compute.

At block 220, the process 200 involves generating a curvilinear triangulation based on the set of curves generated at block 215. Specifically, in one example, the curvilinear triangulation includes the set of curves generated at block 215, modified as will be described below, along with additional connective curves. As discussed above, the vectorization system 100 may include various subsystems; in some embodiments, the triangulation subsystem 140 of the vectorization system 100 performs operations associated with generating the curvilinear triangulation as described below.

An embodiment of vectorization system 100 seeks to connect together the vectorized curves (i.e., the set of curves found at block 215) of the raster image 110 to form the curvilinear triangulation. In other words, the vectorization system 100 seeks to identify new edges to add to the set of curves so as to connect incident curves and thereby form the curvilinear triangulation.

However, in some cases, simply connecting the ends of incident curves might create degeneracies (e.g., a triangle with vertices that are collinear or triangles that intersect) in the resulting triangulation due to the curved nature of the set of curves. Thus, as an intermediate heuristic operation, an embodiment of the vectorization system 100 modifies the set of curves to reduce the incidence of such degeneracies and further, in some embodiments, to guarantee the lack of such degeneracies.

Figure 3:
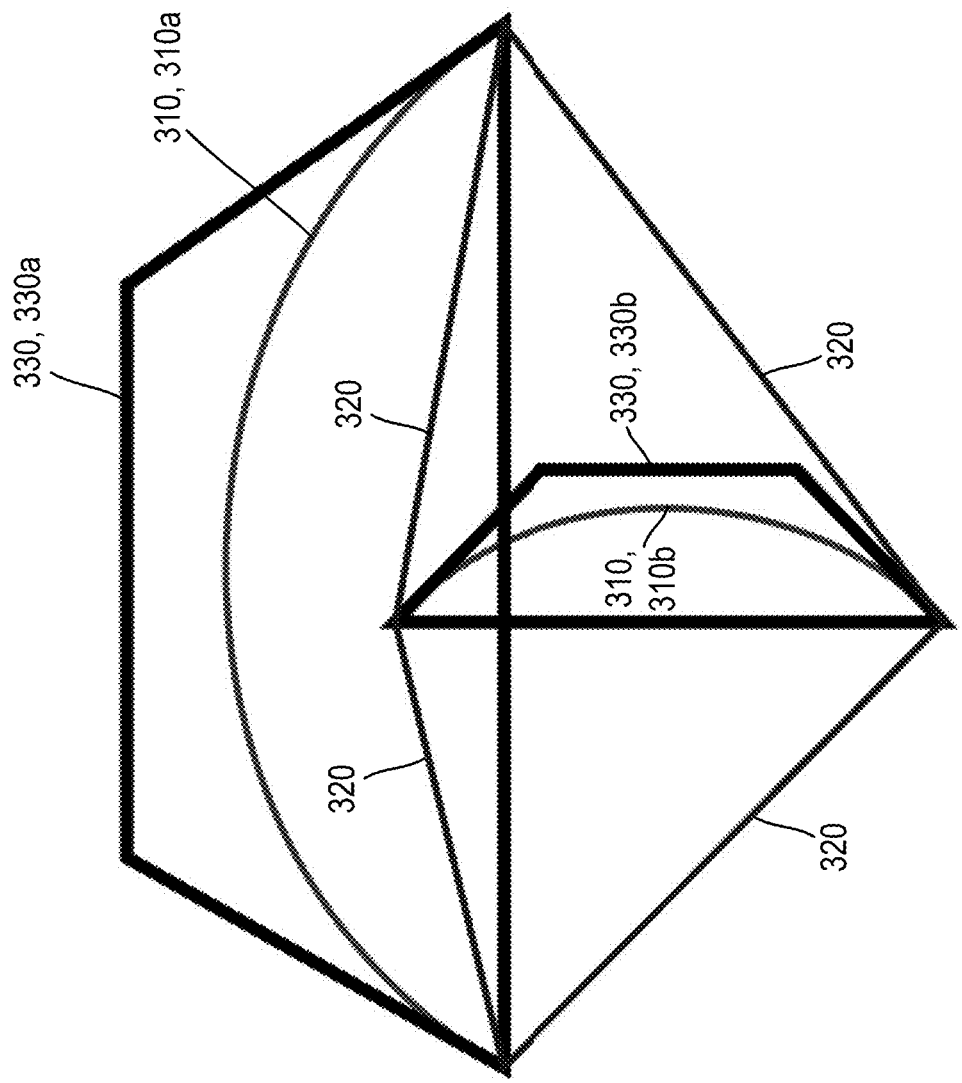
FIG. 3 depicts a case in which a degeneracy might arise when generating a curvilinear triangulation, during the process of vectorizing the raster image, if not for a heuristic operation according to certain embodiments described herein.
Figure 4:
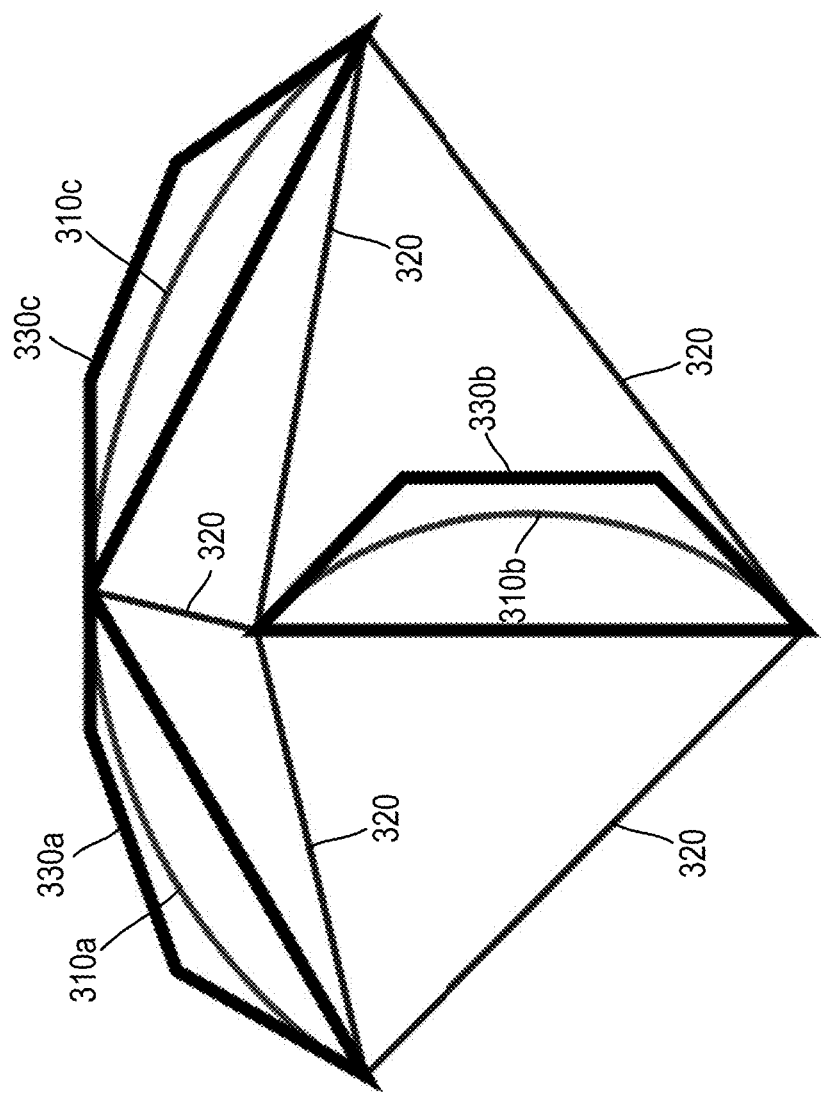
FIG. 4 illustrates an example result of subdividing a curve shown in FIG. 3, according to certain embodiments described herein.

FIG. 3 and FIG. 4 illustrate an example of a heuristic used by the vectorization system 100 to reduce (e.g., to eliminate) the incidence of degeneracies in generating the curvilinear triangulation, according to certain embodiments described herein. Specifically, FIG. 3 depicts a case in which a degeneracy might arise in the curvilinear triangulation if not for the heuristic operation according to certain embodiments. FIG. 3 shows a set of curves 310 (e.g., Bezier curves) generated at block 215, as well as a set of edges 320 that might be added to connect such curves 310 to generate the curvilinear triangulation absent the heuristic described herein.

Additionally, FIG. 3 shows a respective convex hull 330 for each curve 310, as explained further below. As shown in FIG. 3, each convex hull 330 can be a four-sided polygon enclosing a corresponding curve 310. For instance, a first convex hull 330a corresponds to and encloses a first curve 310a, and a second convex hull 330b corresponds to and encloses a second curve 310b.

Some embodiments of the vectorization system 100 evaluate incident curves 310 by using a bounding volume, such as a minimum bounding volume as in the convex hulls 330 shown in FIG. 3. If the convex hulls 330, or other corresponding bounding volumes, of two incident curves 310 intersect, as shown in the example of FIG. 3, an embodiment of the vectorization system 100 further subdivides one or both curves 310 until the corresponding convex hulls 330 no longer intersect. In one example, subdividing a curve 310 involves splitting a curve into two curves that make up the original curve. In one example, determining whether a convex hull 330 of a first curve 310 intersects with another is performed by determining whether any control points of any other curve 310 lie within the convex hull 330 of the first curve 310. If a second curve 310 is identified as having a control point inside the convex hull 330 of the first curve 310, then the first curve 310 is subdivided.

FIG. 4 shows the result of subdividing a curve 310 in the case where the convex hulls 330 of a pair of curves 310 intersected. Specifically, in FIG. 4, the first curve 310a has been subdivided into an updated first curve 310a and a third curve 310c. As such, an example of the vectorization system 100 determines an updated first convex hull 330a corresponding to and enclosing the updated first curve 310a and also determines a third convex hull 330c corresponding to and enclosing the third curve 310c. As shown in FIG. 4, after the subdivision, the convex hulls 330 of the corresponding curves 310 no longer intersect. Additionally, curves 310 having high curvature or are inflected are also subdivided. Specifically, for instance, The vectorization system 100 can identify a curve 310 as inflected if that curve 310 has control points that lie on opposite sides of a line connecting the endpoints of the curve 310, and the vectorization system 100 can identify a curve 310 as having high curvature based on the value of the second derivative at the endpoints of the curve 310. As a result of subdividing such curves 310, the possibility of a curvilinear triangulation based on the curves 310 including degeneracies is reduced (e.g., eliminated).

In some embodiments, the vectorization system 100 uses a triangulation technique, such as the constrained Delaunay triangulation technique, to generate a curvilinear triangulation that includes the curves 310 as constraints, potentially after modification to avoid the intersection of convex hulls 330 as described above. Specifically, an example triangulation technique adds new edges 320, which are straight line segments, between incident curves 310 to connect the incident curves 310 and thereby create a curvilinear triangulation, also referred to a curvilinear mesh, that includes those curves 310 as well as the additional edges 320.

Additionally, some embodiments merge certain triangles or remove overtly small triangles of the curvilinear triangulation. In one example, two or more triangles are merged into a resulting polygon by removing one or more curves 310 between such triangles. For instance, the vectorization system 100 may merge triangles that are deemed small, for instance, such that a combination (e.g., the sum) of the lengths of each of such triangles' sides (e.g., a collection of edges 320 and curves 310) is below a threshold. In another example, the vectorization system 100 can deem a triangle to be overtly small by combining the lengths of the triangle's sides. If the combination is below a threshold, then the vectorization system 100 deems the triangle overtly small. In that case, the vectorization collapses the triangle, such as by contracting the vertices of the triangle into a single vertex. By merging certain triangles or collapsing certain triangles, and thereby removing small, non-essential edges 320 and curves 310, the vectorization system 100 can simplify the curvilinear triangulation so as to make editing of the eventual vector image 120 more intuitive.

At block 225, the process 200 involves updating the curvilinear triangulation by converting to a respective curve 310 each new edge 320 added when generating the curvilinear triangulation at block 220. In some embodiments, a curve 310 is converted, or fit, to an edge 320 by simply representing the edge 320 as a curve 310 (e.g., a Bezier curve), such as by adding two control points to produce a cubic Bezier curve. In some embodiments, the vectorization system 100 updates the curvilinear triangulation by replacing the edges 320 with the new curves 310 fit to those edges 320. As such, an example of the curvilinear triangulation now includes curves 310, such as Bezier curves, in place of all edges 320.

Additionally, in some embodiments, the triangulation technique might have undesirably generated overlapping curves, specifically in the case where an added edge 320 crossed a curve 310. In such a case, an embodiment of the vectorization system 100 rotates the tangent of the new curve 310 corresponding to (i.e., that was fit to) the offending edge 320. For instance, the tangent of the new curve 310 can be represented as a vector between a first endpoint and an adjacent first control point. An embodiment of the vectorization system 100 rotates the new curve 310 such that no curve 310 emanating from the first endpoint intersects any other such curve 310 and such that the signed angle between the tangents of subsequent emanating curves, in counterclockwise order, is positive.

Figure 5:
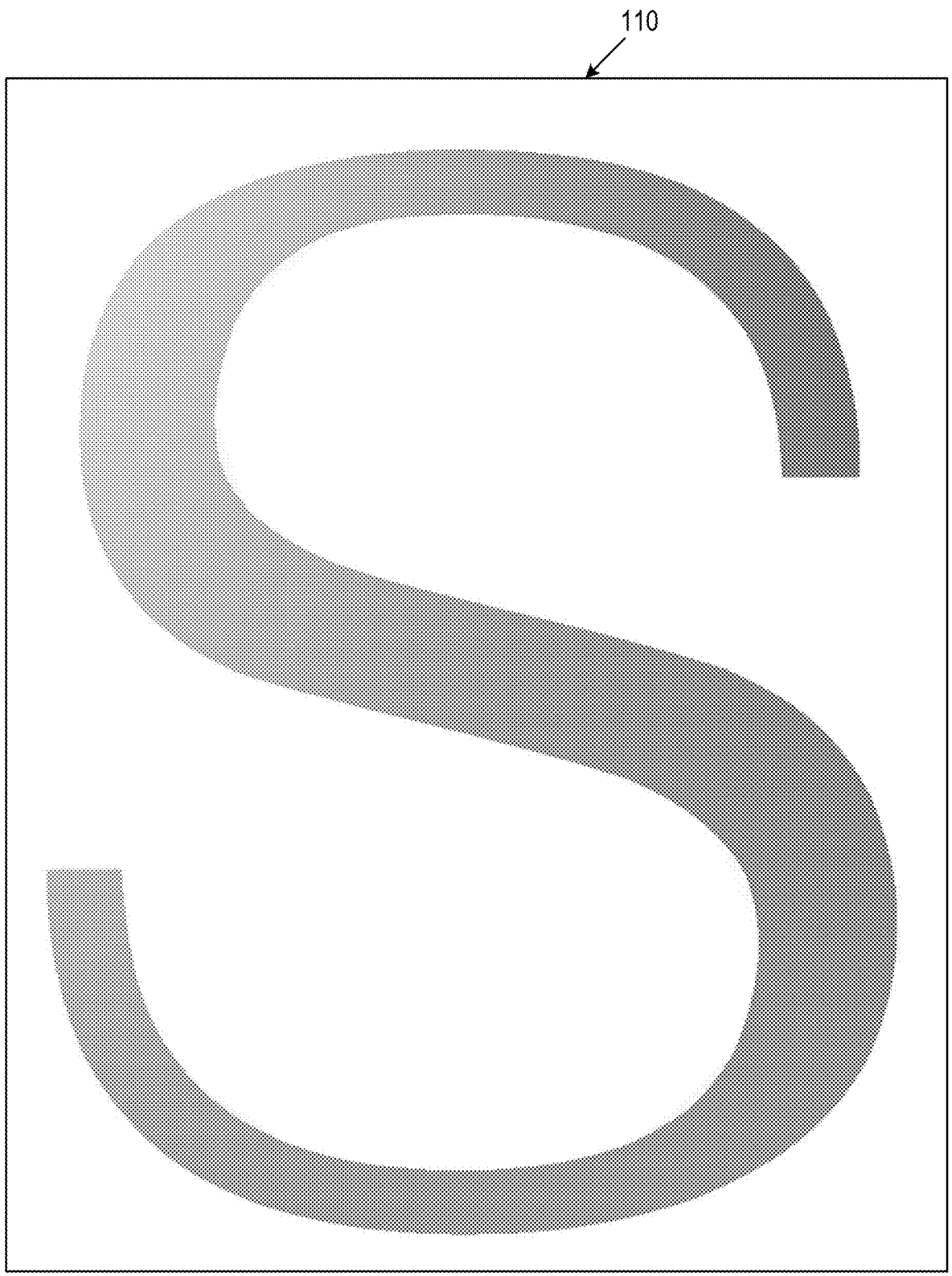
FIG. 5 illustrates an example of a raster image that might be input into the vectorization system, according to certain embodiments described herein.

FIG. 5 illustrates an example of a raster image 110 that might be input into the vectorization system 100, according to certain embodiments. As shown, the raster image 110 includes smooth color transitions, which appear as grayscale in in FIG. 5.

Figure 6:
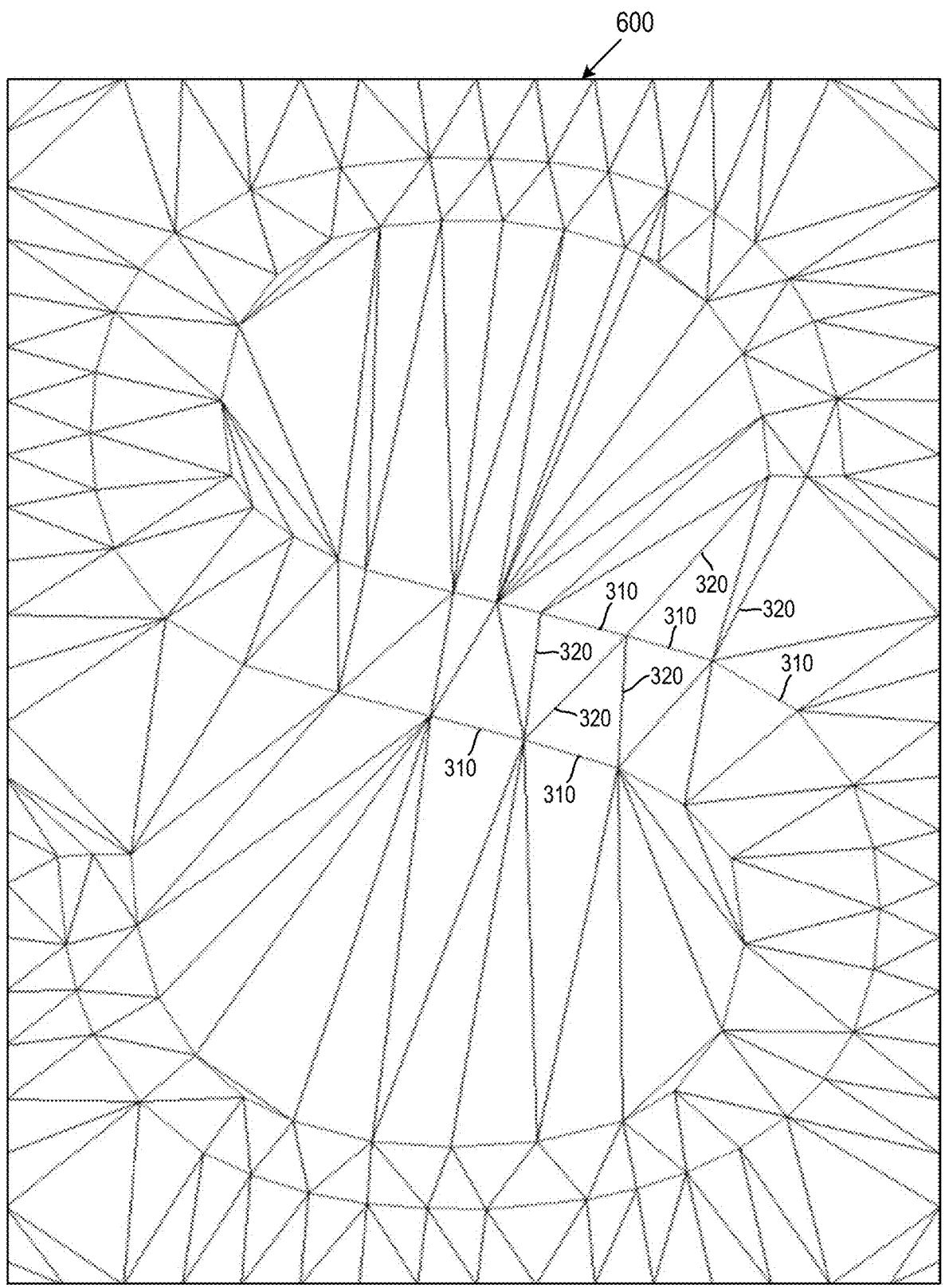
FIG. 6 illustrates an example of a curvilinear triangulation generated during the process of vectorizing the raster image, according to certain embodiments described herein.

FIG. 6 illustrates an example of a curvilinear triangulation 600 based on the curves 310 generated at block 215, according to certain embodiments described herein. Specifically, FIG. 6 shows a curvilinear triangulation 600 of the raster image 110 shown in FIG. 5. FIG. 6 illustrates the set of curves 310 generated at block 215, or resulting from further subdividing such a curve 310 to avoid intersection of convex hulls 330, and FIG. 6 further illustrates edges 320 added to connect such curves 310 to generate the curvilinear triangulation 600. For the sake of simplicity, not all curves 310 and edges 320 are labeled in the FIG. 6.

Returning to FIG. 2, block 230 is the beginning of color application to the curvilinear triangulation 600 and, more specifically, converting the curvilinear triangulation 600 to a gradient mesh and applying color to each control point of the gradient mesh. As described above, for each edge identified in the raster image 110, an embodiment of the vectorization system 100 finds 2D positions of the edge's vertices. For each such vertex, the vectorization system 100 adjusts the 2D control points of a curve 310, such as a Bezier curve, to closely fit the original 2D edge. As described in detail below, to colorize the vector image 120, an embodiment of the vectorization system 100 converts triangles bounded by the curves 310 (i.e., in the curvilinear triangulation 600) to mesh patches of a gradient mesh. Each mesh patch is delimited by the 2D positions of the vertices. For each vertex of the curvilinear triangulation 600, the vectorization system 100 adjusts the control points of a surface, such as a 3D Bezier surface, to fit the 3D distribution of color samples (e.g., red-green-blue color samples) inside the mesh patch. As compared to conventional systems for vectorizing raster images, embodiments described herein require fewer control points, which leads to a more compact vector representation that is more efficient to evaluate when rendering the vector image 120 without loss of fidelity. Further, based in part on the use of edge detection and curve-fitting described above, the resulting vector image 120 retains a high level of fidelity to the raster image 110 while being more intuitive for a user to control and use.

Specifically, at block 230, after obtaining the curvilinear triangulation 600, the process 200 involves generating a gradient mesh based on the curvilinear triangulation 600. As described above, the vectorization system 100 may include various subsystems; in some embodiments, the colorization subsystem 150 generates the gradient mesh based on the curvilinear triangulation 600 and, further, determines color attributes for control points of the gradient mesh as described below.

Generally, a gradient mesh is a graphical object used to apply color in the form of gradients to an object. Given a gradient mesh and colors for its control points, a gradient can be determined for each mesh patch (i.e., polygonal patch) of the gradient mesh. For instance, given a gradient mesh and a color (i.e., a set of color attributes) for each control point of the gradient mesh, an image-processing application 160 can determine how to color a mesh patch associated with those control points.

In some embodiments, generating the gradient mesh is performed by using each polygon (e.g., each triangle) of the curvilinear triangulation 600 as a mesh patch of the gradient mesh, such that the curvilinear triangulation is preserved. Additionally, an embodiment of the vectorization system 100 adds one or more additional control points into each mesh patch. For instance, the vectorization system 100 adds six inner control points the interior of each mesh patch to enable more accurate (i.e., closer to the raster image 110) color interpolation between control points. In some embodiment, given these control points, the geometric components of each mesh patch are defined, but color components are still needed.

In one example, each mesh patch is associated with, or includes, twelve control points. These control points include the three vertices of the curvilinear triangle, from the curvilinear triangulation 600, corresponding to the mesh patch. As mentioned above, some embodiments use cubic Bezier curves as the curves 310; in that case, the three curves 310 bounding the mesh patch include two more control points each, and these six control points become control points of the gradient mesh as well. Additionally, the mesh patch include six interior control points that are positioned based on an established positioning rule that is a function of the positions of the other nine control points. Thus the gradient mesh inherits the geometry of the curvilinear triangulation.

Figure 7:
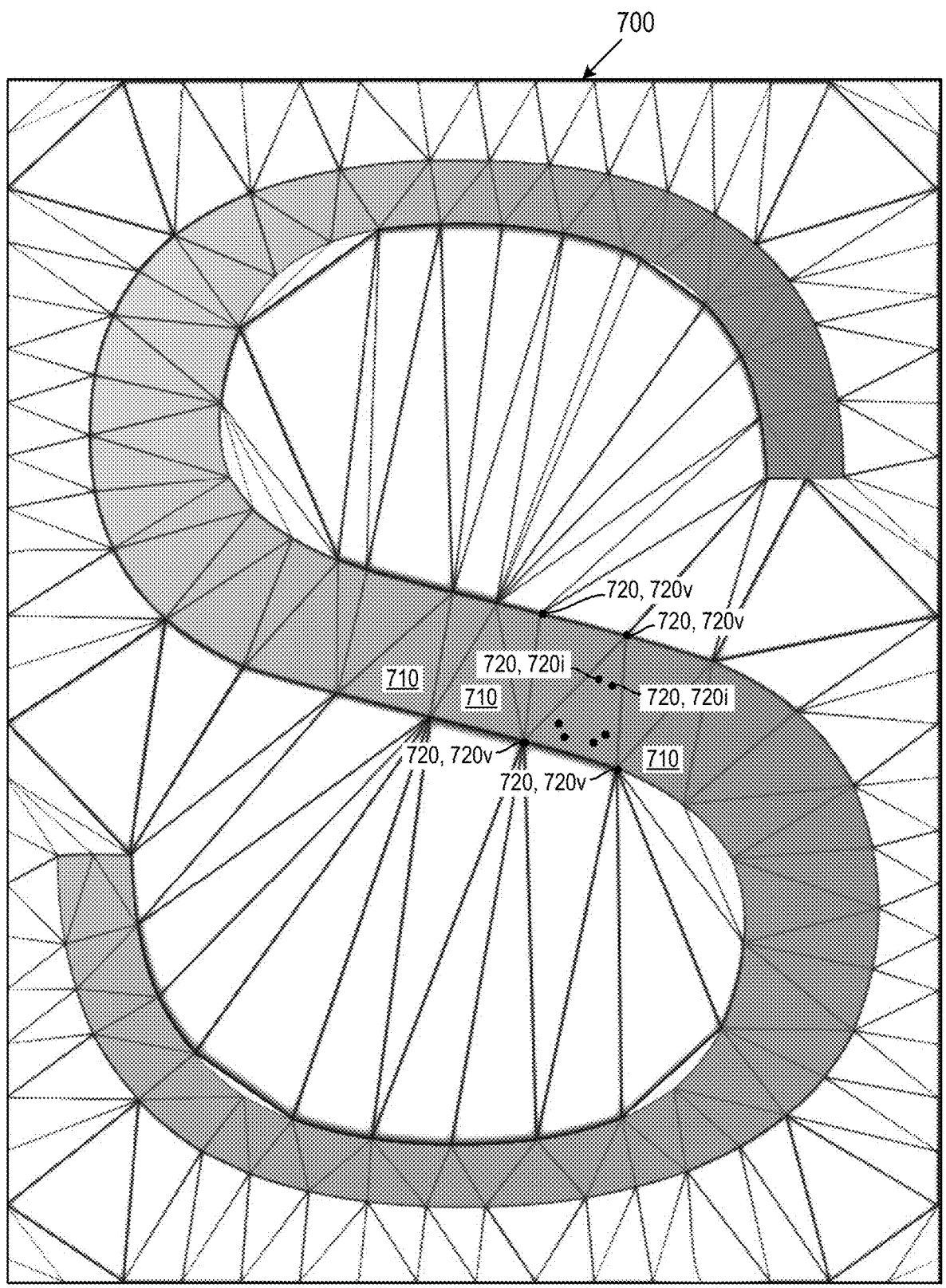
FIG. 7 illustrates an example of a gradient mesh generated during the process of vectorizing the raster image, according to certain embodiments described herein.

FIG. 7 illustrates an example of a gradient mesh 700, according to certain embodiments described herein. Specifically, FIG. 7 illustrates an example of a gradient mesh 700 generated based on the curvilinear triangulation 600 shown in FIG. 6. As described above, a gradient mesh 700 includes various mesh patches 710 and various control points 720, including vertex control points 720v located at vertices of the mesh patches 710 as well as curve control points 720 (not shown) that correspond to control points of the curves 310 and as well as interior control points 720i inside each mesh patch 710. In some embodiments, the six interior control points 720i are arranged into three pairs, with each pair associated with a respective corner. The two interior control points 720i of a pair are arranged in a line perpendicular to another line that extends from the respective corner, splitting the angle of the corner. For instance, given a vertex control point $v_i$ of a triangle and given the tangent control points $t_{i,1}$ and $t_{i,2}$ of the two curves 310 emanating from that vertex control point, the vectorization system 100 can set the position of each interior control point $I_{i,1}$ as follows: $I_{i,1}=v_i+(t_{i,1}-v_i)+(t_{i,2}-v_i)$. In some embodiments, the vectorization system 100 can adjust the positions of the interior control point 720i after color attributes have been assigned to the interior control points 720i. Although not shown in FIG. 7, an example of a mesh patch 710 also includes six control points 720 corresponding to the control points of the curves 310 other than the vertices. In some embodiments, each polygon of the curvilinear triangulation 600 now acts as a mesh patch 710 in the gradient mesh 700. For the sake of simplicity, not all control points 720 are shown in FIG. 7, and not all shown control points 720 are labeled.

Returning to FIG. 2, at block 235, the process 200 involves determining color attributes of control points 720 of the gradient mesh 700. The vectorization system 100 determines a color for a control point 720 based on the following, for example: the pixel color of a pixel at the position in the raster image 110 corresponding to the position of the control point 720, the basis functions contributing the geometric component (i.e., the position of) the control point 720, and the specific mesh patch 710 to which the control point 720 belongs.

Given a gradient mesh 700, the colors of the control points 720 of a mesh patch 710 determine a color gradient associated with that mesh patch 710. Thus, when an image-processing application 160 supporting gradient meshes 700 identifies a color for each such control point 720, as stored in a vector image 120, the image-processing application can then render the various gradients of the gradient mesh 700 so as to display, or otherwise process or utilize, colors of a vector image 120. An example technique for determining colors of the control points 720 will described in detail below.

At block 240, the process 200 involves merging adjacent triangles having similar color components according to the gradient mesh 700 determined at blocks 230 and 235. In some embodiments, after color components have been determined for the various control points 720 of the gradient mesh 700, the vectorization system 100 merges adjacent triangles deemed to have flat colors across certain curves 310, specifically, across curves 310 that were edges 320 added to create the curvilinear triangulation 600 based on the original structural edges and appearance edges identified in the raster image 110. In other words, an embodiment the vectorization system 100 may remove a curve 310 based on an edge 320 added at block 220 but not a curve 310 fit to an original edge of the raster image 110 identified at block 210, because the vectorization system 100 seeks to retain original edges of the raster image 110. After color components have been fit to control points 720 at block 235, the vectorization system 100 removes curves 310, such as those determined at block 225, if vertices of the adjacent mesh patches 710 have the same or similar (e.g., within an error threshold) color components.

In one example, two adjacent triangles are mesh patches 710 in a region of uniform color. After fitting the color components to each such mesh patch 710, the vectorization system 100 analyzes the vertices of the two mesh patches 710. Specifically, the mesh patches share two vertices, which act as control points 720, but each vertex was assigned color components with respect to each mesh patch 710. If those color components are the same within an error threshold for both mesh patches 710 for each of the vertices, then the vectorization system 100 removes the curve 310 between the two mesh patches 710, forming a single mesh patch 710 that combines the two triangles into a polygon with four sides. Analogously, an example of the vectorization system 100 merges polygons other than triangles by comparing the color components of vertices of curves 310, added at block 220 and 225, separating such polygons and then removing such curves 310 when the color components of the vertices are deemed similar enough (i.e., within an error threshold) across the mesh patches 710. This operation of merging polygonal mesh patches 710 could be performed iteratively so as to grow a mesh patch 710 as large as possible, or additionally or alternatively, the vectorization system 100 generates as many quadrilateral mesh patches 710 as possible in this manner and then attempts to combine polygons further by generating as many five-sided polygonal mesh patches 710 and then as many six-sided polygonal mesh patches 710 as possible, and so on.

At block 245, the process 200 involves generating a vector image 120 (i.e., a vector representation of the raster image 110) based on the gradient mesh 700. Generally, a vector image 120 is stored as one or more vector primitives, and a gradient mesh 700 is such a vector primitive. Thus, to generate the vector image 120, an example of the vectorization system 100 saves an indication of the gradient mesh 700, including colors of control points 720, as the vector image 120. For instance, the indication of the gradient mesh 700 could be an indication of the curves of each mesh patch 710 and an indication of the positions of the control points 720 associated with each mesh patch 710, along with color attributes of each such control point. Given this information, an image-processing application 160 can render the gradient mesh 700 and thereby render the vector image 120 as needed.

Figure 8:
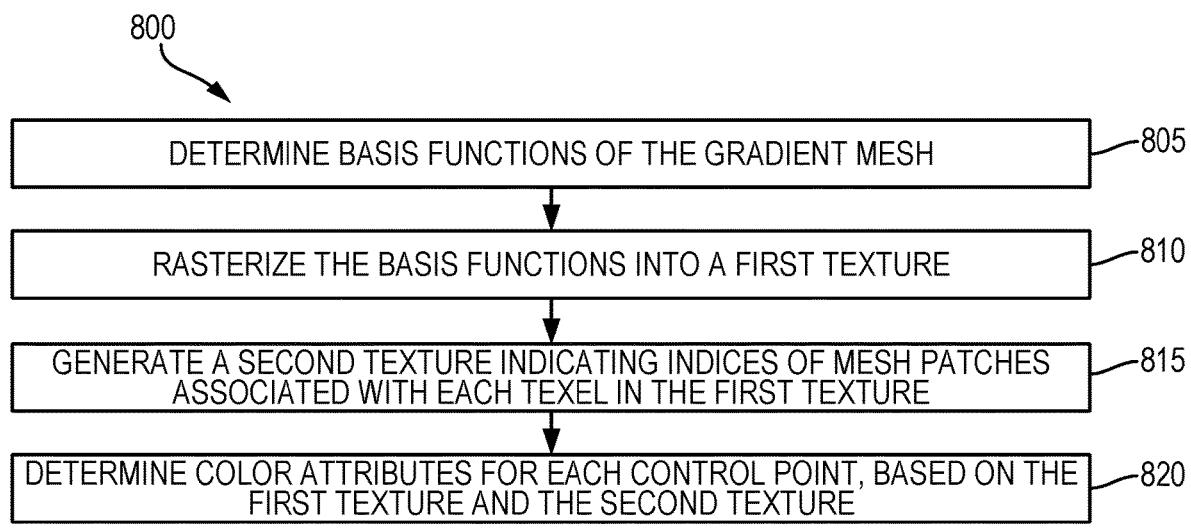
FIG. 8 is a diagram of a process of determining colors of control points of the gradient mesh, according to certain embodiments described herein.

FIG. 8 is a diagram of a process 800 of determining the colors of control points 720 of the gradient mesh 700, according to certain embodiments described herein. An embodiment of vectorization system 100 performs this process 800 or similar at block 235 of the above process 200 of generating a vector image 120. As mentioned above, based on the colors of the control points 720, an image-processing application can render the gradient mesh 700 with associated color gradients and, thereby, render the vector image 120.

At block 805, the process 800 involves determining basis functions of the gradient mesh 700. In some embodiments, the basis functions of the gradient mesh 700 are the same for each mesh patch 710. For instance, the mesh patches 710 are all triangular, so the vectorization system 100 uses standard barycentric coordinates (u, v, w) to parametrize each curvilinear triangle acting as a mesh patch 710. A mesh patch 710 is associated with a combination of control points $P_q$ and basis functions $B_q(u, v, w)$. Specifically, the vectorization system 100 can evaluate a mesh patch 710 as follows: $T(u, v, w) = \Sigma_1^{15} P_q \times B_q(u, v, w)$, such that all fifteen control points of a mesh patch 710 are multiplied by their basis functions. Because each control point 720 is in two-dimensional space and thus has only (x, y) coordinates, evaluating $T(u, v, w)$ will give some position (x, y) in the image plane of the raster image 110 in some embodiments.

At block 810, the process 800 involves rasterizing the basis functions to form a first texture having the same resolution as the raster image 110 or, in other words, having texel dimensions equal to the pixel dimensions of the raster image 110. In some embodiments, the vectorization system 100 renders the basis functions into the first texture by taking into account only the geometric part (i.e., excluding the color attributes) of the control points 720 of the gradient mesh 700. Thus, each texel of the first texture stores the barycentric coordinates of the gradient mesh patch 710 that maps to the position (i.e., the coordinates in the first texture) of that texel.

In one example, the vectorization system 100 renders the basis functions to a texture with the same resolution as the input image through the use of tessellation shaders, which may be implemented by a graphics processing unit (GPU). In this case, the GPU utilizes the tessellation shaders to evaluate $T(u, v, w)$ for various (u, v, w) such that u+v+w=1, to compute (x, y) positions in the image plane. Instead of storing a color in the texture at each texel position (x, y), however, the vectorization system 100 stores the barycentric coordinates (u, v, w).

At block 815, the process 800 involves generating a second texture that indicates indices of mesh patches 710 associated with the texels in the first texture generated at block 810 above. Specifically, the vectorization system 100 stores, at each texel in the second texture, an index (i.e., a label) indicating which mesh patch 710 contributes to the texel position and, thus, to the corresponding pixel position in the raster image 110. Because each texel falls within a single mesh patch 710, the value stored at each texel is the integer index, or other identifier, of that mesh patch 710 in some embodiments.

At block 820, the process 800 involves determining, for each control point 720 in the gradient mesh 700, color attributes for that control point 720. To this end, an embodiment of the vectorization system 100 uses the first texture and the second texture to perform a least-squares fit of the color attributes of the control points 720. In other words, the vectorization system 100 solves for color attributes of a control point 720, using a least-squares technique, given the basis functions, the control point positions, and the pixel color at the corresponding position in the raster image 110.

In one example, for each pixel $p_j$ in the raster image 110, the vectorization system 100 already has access to the following: the barycentric coordinates $u_j=(u, v, w)$, as stored in the first texture; the index of the mesh patch 710 associated with the pixel, as stored in the second texture; and the color attributes (e.g., red, blue, and green color values) of the raster image 110. Thus, for each pixel, the vectorization system can set up an equation $\Sigma_1^{15} P_{q,c} \times B_q(u_j) = R_j$, where $P_q$ are the color components of the control points 720 of the mesh patch 710 with label $L_j$. Specifically, $R_j$ is the pixel color rendered at pixel $p_j$ by evaluating the sum of each $P_{q,c}$ multiplied by $B_q$. The set of each $P_{q,c}$ is the color components of a control point 720 represented in $P_q$. In other words, for each pixel $p_j$ an equation is set up as $\Sigma_1^{15} P_{q,c} \times B_q(u_j)$. To determine a color for a control point 720, an embodiment of the vectorization system 100 minimizes the square of the distance between (1) the color resulting from evaluating a mesh patch 710 according to the color components of its control points 720 and the value of u, (u, v, w) and (2) the color at the pixel location $p_j$.

Specifically, in some embodiments, given that the first texture and the second texture are already established, the vectorization system 100 solves a system of equations Ax=b per mesh patch 710 to determine values of x for each mesh patch 710. The vector x, which is being solved for, is the vector of color components $P_{q,c}$ of the control points 720 of the mesh patch 710; each such control point has a color components $P_{q,c}$. The vector b is the vector of pixel colors in the input raster image 110 corresponding to the mesh patch 720, where these pixel colors have been determined based on the second texture having the labels $L_j$. The matrix A includes the basis functions $B_q(u_j)$ associated with the control points 720 with color components $P_{q,c}$ in the vector x. For instance, each row j of the matrix A includes the basis functions $B_q(u_j)$, and the number of rows in the matrix A corresponds to the number of pixels to which that mesh patch 710 renders. For each mesh patch 710, the embodiment of the vectorization system 100 solves for x to determine the color components of the control points 720 of the mesh patch 710.

In some embodiments the color attributes of one or more control points 720 in the gradient mesh 700 are restricted so as to ensure a smoother transition between adjacent mesh patches 710. For instance, the vectorization system 100 requires that a set of two or more control points, for instance, all the interior control points 720i and other control points 720 of a given mesh patch 710, have the same color attributes. This allows less variability in color and thereby smoother color transitions between mesh patches 710. To this end, the vectorization system 100 utilizes fewer columns in matrix A described above and fewer rows in the solution vector x in the least squares solving process. For instance, when the vectorization system 100 sets the interior control points 720i to have the same color attributes as one another, the formula for determining color components, $R_j = P_{q,c} \times B_q(u_j)$, as different basis functions are applied to the same color component $P_{q,c}$. In effect, the vectorization system 100 sums the basis functions applied to the interior control point 720$i$, and therefore fewer columns are required in the matrix A. Thus, in such embodiments, the basis functions $B_q$ can be summarized as being applied to a single control point 720 because multiple of the $P_{q,c}$ in a mesh patch 710 will have the same colors.

In some embodiments, use of the gradient mesh 700 as described above, regardless of whether interior control points 720$i$ within a mesh patch 710 are restricted to common color attributes, results in a color fit per mesh patch 710 that ensures smooth gradients between adjacent mesh patches 710, particularly across appearance edges. However, some embodiments allow discontinuities of color across structural edges. For instance, an embodiment of the vectorization system 100 performs a smoothing operation after the color components have been determined for the appearance edges (i.e., for the curves 310 corresponding to the appearance edges). To this end, for mesh patches 710 that share a common appearance edge, the vectorization system 100 sets the color components of that common appearance edge (i.e., the color components of the control points 720 of that common appearance edge) to an average of the color components calculated for that common appearance edge when evaluating each such mesh patch 710. However, the vectorization system 100 need not perform this smoothing operation across structural edges because discontinuities are expected across structural edges.

In some embodiments, the vectorization system 100 utilizes a combination of 2D geometric surfaces and 3D color surface to provide smooth color transitions. Each control point 720 represents a combination of geometry and color, as each control point 720 has two-dimensional geometric coordinates and three-dimensional color coordinates. Because the colors of a mesh patch 710 are determined based on a combination of higher-order functions and colors at pixels corresponding to the control points 720, the vectorization system 100 can generate complex gradients that cannot be created with linear color gradients. As such, a mesh patch 710 can accurately reproduce color gradients found in a raster images 110, where such mesh patches 710 are curved in the color space (e.g., the red-green-blue space) in contrast to flat color surfaces created when applying linear gradients.

As described above, given the color attributes of the various control points 720 of the gradient mesh 700, an image-processing application 160 can render a color gradient for each mesh patch 710. As such, the gradient mesh 700, including the color attributes of its control points, are sufficient information to form a vector image 120 renderable by an image-processing application.

Figure 9:
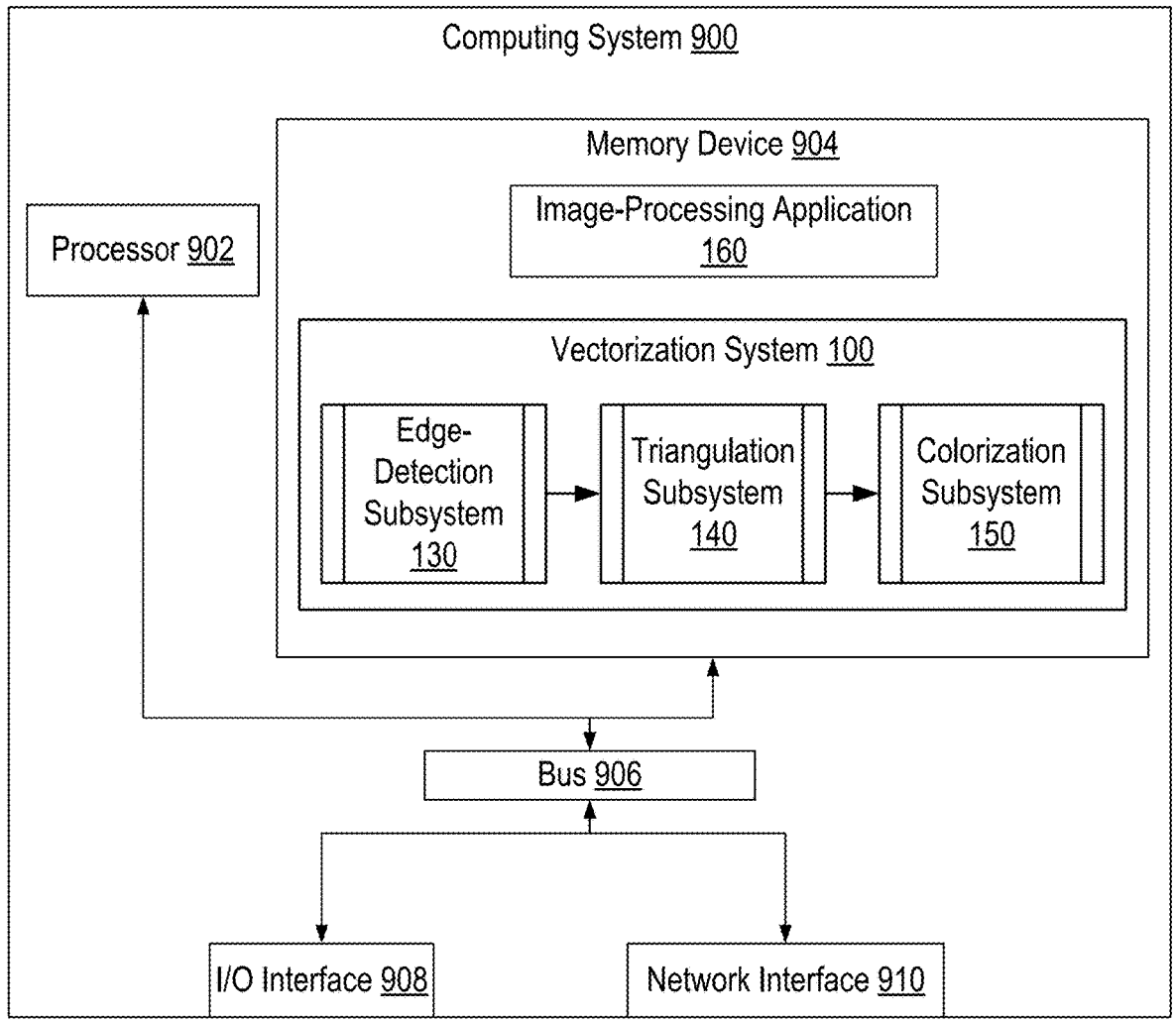
FIG. 9 depicts an example of a computing system that executes the vectorization system, according to certain embodiments described herein.

Any suitable computing system or group of computing systems can be used for performing the operations described herein. For example, FIG. 9 depict an example of a computing system 900 that executes a vectorization system 100, according to certain embodiments described herein. In some embodiments, the computing system 900 also executes an image-processing application 160, as depicted in FIG. 9. In other embodiments, a separate computing system having devices similar to those depicted in FIG. 9 (e.g., a processor, a memory, etc.) executes the image-processing application 160 to render vector images 120 generated by the vectorization system 100.

The depicted examples of a computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, such as input or output devices. For example, the computing system 900 is shown with one or more input/output ("I/O") interfaces 908. An I/O interface 908 can receive input from input devices or provide output to output devices. One or more buses 906 are also included in the computing system 900. The bus 906 communicatively couples one or more components of a respective one of the computing system 900.

The computing system 900 executes program code that configures the processor 902 to perform one or more of the operations described herein. The program code includes, for example, the edge-detection subsystem 130, the triangulation subsystem 140, and the colorization subsystem 150, or other suitable applications that perform one or more operations described herein. The program code may be resident in the memory device 904 or any suitable computer-readable medium and may be executed by the processor 902 or any other suitable processor. In some embodiments, both the vectorization system 100 and the image-processing application 160 are stored in the memory device 904, as depicted in FIG. 9. In additional or alternative embodiments, one or more of the vectorization system 100 and the image-processing application 160 are stored in different memory devices of different computing systems. In additional or alternative embodiments, the program code described above is stored in one or more other memory devices accessible via a data network.

The computing system 900 can access the raster image 110 and provide the vector image 120 in any suitable manner. In some embodiments, some or all data (e.g., raster images 110 and vector images 120), models, and functions described herein are stored in the memory device 904, as in the example depicted in FIG. 9. For example, a computing system 900 that executes the vectorization system 100 generates the vector image 120 for display by the image-processing application 160 also executed by the computing system 900. In additional or alternative embodiments, one or more of these data, models, and functions are stored in the same memory device (e.g., one of the memory device 904). In additional or alternative embodiments, one or more of the data, models, and functions described herein are stored in one or more other memory devices accessible via a data network.

The computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and the like. The computing system 900 is able to communicate with one or more other computing devices (e.g., a computing system executing an image-processing application 160 when the image-processing application 160 and the vectorization system are executed on different computing systems) via a data network using the network interface device 910.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   accessing a digital image in a raster representation;
   identifying edges in the digital image;
   generating a set of curves by fitting each of the edges with a corresponding curve;
   generating a curvilinear triangulation comprising the set of curves;
   generating a gradient mesh based on the curvilinear triangulation, the gradient mesh comprising polygons of the curvilinear triangulation and further comprising control points based on the curvilinear triangulation;
   determining a color of each control point of the gradient mesh, based on pixel colors of pixels of the raster representation corresponding to the control points in the gradient mesh; and
   generating a vector representation of the digital image, the vector representation comprising the gradient mesh with colors of the control points.

2. The method of claim 1, wherein fitting a first edge with a first corresponding curve comprises progressively subdividing the first edge and fitting a new curve to the subdivided first edge until an error between the first edge and the new curve is less than a threshold.

3. The method of claim 1, wherein generating the curvilinear triangulation comprises:
   determining a convex hull for each curve in the set of curves;
   identifying a pair of curves whose corresponding convex hulls intersect; and
   subdividing at least one curve in the pair of curves based on the corresponding convex hulls intersecting.

4. The method of claim 3, wherein generating the curvilinear triangulation further comprises performing a triangulation to connect incident curves of the set of curves.

5. The method of claim 4, further comprising simplifying triangles of the curvilinear triangulation into larger polygons.

6. The method of claim 1, wherein determining a color of each control point of the gradient mesh comprises:
   for a control point in the gradient mesh, determining basis functions of the gradient mesh that contribute to the control point;
   determining, for the control point, color attributes based on a pixel color of the pixel corresponding to the control point in the raster representation and further based on respective contributions of the basis functions; and
   performing a least-squares fit to determine the color attributes of the control point based on the pixel color and based on an evaluation of the basis functions.

7. The method of claim 6, wherein determining a color of each control point of the gradient mesh further comprises assigning a common color to a set of control points associated with a common mesh patch of the gradient mesh.

8. The method of claim 1, wherein determining a color of each control point of the gradient mesh comprises:

rasterizing basis functions of the gradient mesh into a first texture based on the digital image, the first texture comprising a first plurality of texels;

rendering a second texture comprising a second plurality of texels, wherein each texel in the second texture encodes an indication of which polygon of the gradient mesh contributes to the texel; and based on the first texture and the second texture, fitting respective color attributes to the control points of the gradient mesh.

9. A system comprising:

a processor configured to execute computer-readable instructions;

a memory configured to store the computer-readable instructions that, when executed by the processor, cause the processor to perform operations comprising:

access a digital image in a raster representation;

identify edges in the digital image;

generate a set of curves by fitting each of the edges with a corresponding curve;

generate a curvilinear triangulation comprising the set of curves;

generate a gradient mesh based on the curvilinear triangulation, the gradient mesh comprising polygons of the curvilinear triangulation and further comprising control points based on the curvilinear triangulation;

determine a color of each control point of the gradient mesh, based on pixel colors of pixels of the raster representation corresponding to the control points in the gradient mesh; and generate a vector representation of the digital image, the vector representation comprising the gradient mesh with colors of the control points.

10. The system of claim 9, wherein fitting a first edge with a first corresponding curve comprises progressively subdividing the first edge and fitting a new curve to the subdivided first edge until an error between the first edge and the new curve is less than a threshold.

11. The system of claim 9, wherein generating the curvilinear triangulation comprises:

determining a convex hull for each curve in the set of curves;

identifying a pair of curves whose corresponding convex hulls intersect; and subdividing at least one curve in the pair of curves based on the corresponding convex hulls intersecting.

12. The system of claim 11, wherein generating the curvilinear triangulation further comprises performing a triangulation to connect incident curves of the set of curves.

13. The system of claim 12, further comprising simplifying triangles of the curvilinear triangulation into larger polygons.

14. The system of claim 9, wherein determining a color of each control point of the gradient mesh comprises:

for a control point in the gradient mesh, determining basis functions of the gradient mesh that contribute to the control point;

determining, for the control point, color attributes based on a pixel color of the pixel corresponding to the control point in the raster representation and further based on respective contributions of the basis functions; and performing a least-squares fit to determine the color attributes of the control point based on the pixel color and based on an evaluation of the basis functions.

15. The system of claim 14, wherein determining a color of each control point of the gradient mesh further comprises assigning a common color to a set of control points associated with a common mesh patch of the gradient mesh.

16. The system of claim 9, wherein determining a color of each control point of the gradient mesh comprises:

rasterizing basis functions of the gradient mesh into a first texture based on the digital image, the first texture comprising a first plurality of texels;

rendering a second texture comprising a second plurality of texels, wherein each texel in the second texture encodes an indication of which polygon of the gradient mesh contributes to the texel; and based on the first texture and the second texture, fitting respective color attributes to the control points of the gradient mesh.

17. A method comprising:

accessing a digital image in a raster representation;

identifying edges in the digital image;

generating a set of curves by fitting each of the edges with one or more corresponding curves;

generating a curvilinear triangulation comprising the set of curves by connecting, with new edges, incident curves of the set of curves;

updating the curvilinear triangulation by replacing each new edge with one or more new curves fit to the new edge;

generating a gradient mesh based on the curvilinear triangulation; and generating a vector representation of the digital image, the vector representation comprising the gradient mesh.

18. The method of claim 17, wherein identifying the edges in the digital image comprises:

using a first edge-detection technique to identify structural edges in the digital image;

using a second edge-detection technique to identify appearance edges in the digital image, the second edge-detection technique having a configurable threshold; and receiving a user input indicating a value for the configurable threshold.

19. The method of claim 18, wherein generating the curvilinear triangulation comprises:

determining a convex hull for each curve in the set of curves;

identifying a pair of curves whose corresponding convex hulls intersect; and subdividing at least one curve in the pair of curves based on the corresponding convex hulls intersecting.

20. The method of claim 18, wherein:

the gradient mesh comprises polygons of the curvilinear triangulation and further comprises control points based on the curvilinear triangulation; and a color of each control point is based on a corresponding pixel color in the raster representation and further based on a contribution of basis functions of the gradient mesh to the control point.

* * * * *